United States Patent Office 2,947,031
Patented Aug. 2, 1960

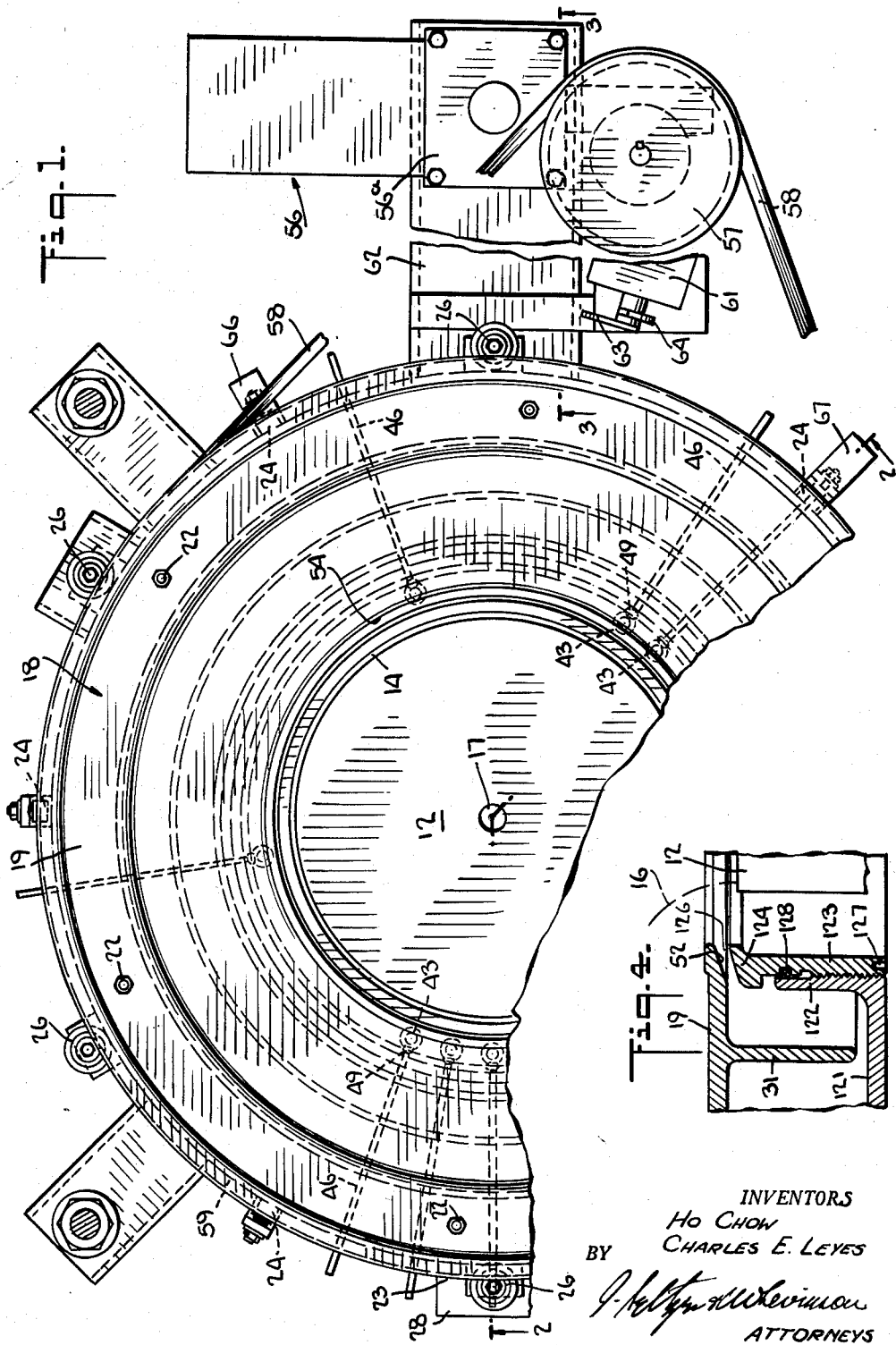

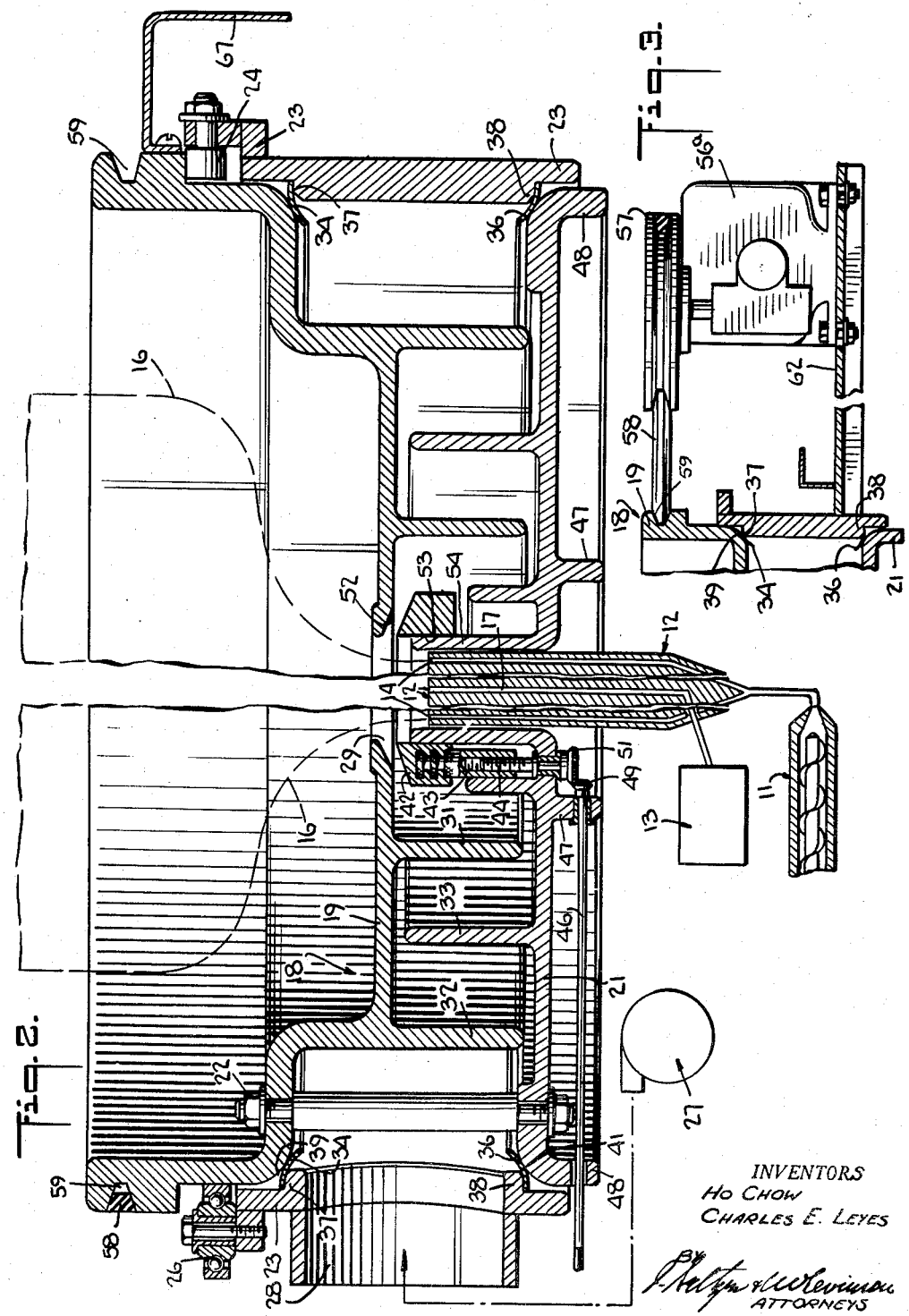

2,947,031

METHOD AND APPARATUS FOR COOLING EXTRUDED TUBING

Ho Chow, New York, N.Y., and Charles E. Leyes, Union, N.J., assignors to Celanese Corporation of America, New York, N.Y., a corporation of Delaware Filed Feb. 20, 1956, Ser. No. 566,494

15 Claims. (Cl. 18—14)

This invention relates to extrusion and relates more particularly to the production of blown tubing.

Blown tubing is usually made by extruding a hot thermoplastic material through an annular die and inflating the resulting tubing to the desired diameter and thickness as it is drawn from the die. Thus, air under pressure may be passed, through a central aperture in the die, into the interior of the extruded tubing. In order to cool the tubing so that the thermoplastic material will be in set condition when the tubing has been inflated to the desired extent, it is customary to direct a cooling fluid, such as air, onto the outside of the tubing in the neighborhood of the point of extrusion, the cooling fluid being supplied through a ring through which the tubing passes.

During inflation the thickness of wall of the tubing decreases. The final wall thickness depends on such factors as the rate at which the tubing is withdrawn from the die, the amount of the air used for inflation, the linear rate of travel of the inflated tubing and the rate at which the material is cooled by the cooling fluid. Generally, it is very difficult to extrude from the die a tubing whose wall is of perfectly uniform thickness or to cool all parts of the tubing at a uniform rate. As a result, during inflation the hotter areas of the tubing are stretched to a greater degree, and therefore have thinner walls, than the cooler areas. When the resulting non-uniform blown tubing is flattened and wound, there is obtained a roll which is uneven and humped due to the non-uniformity of the wall thickness. It has been proposed that a more even roll can be produced if the cooling ring is rotated about the axis of the tubing. This has been found to be effective for use in the production of tubing of thinner gauge, e.g. polyethylene tubing wherein the thickness of the wall is less than about 0.003 inch, but when thicker films are produced the resulting wound rolls are still undesirably uneven.

It is therefore one object of this invention to provide a method and apparatus for the production of blown tubing which will be free from the foregoing and other defects.

Another object of this invention is the provision of a novel method and apparatus for the production of more uniform blown tubing.

Other objects of this invention will be apparent from the following detailed description and claims.

In accordance with one aspect of this invention a hot thermoplastic material is continuously extruded and inflated in tubular condition and a cooling fluid is applied, to the outside of the tubing being extruded and inflated, by means of a ring through which the tubing passes and which oscillates about the center axis of the tubing passing therethrough. It has been found that, particularly for thicker gauge material, a more uniform roll of wound tubing is produced when the ring oscillates instead of rotating.

The angle and period of oscillation may be varied widely. Thus, good results have been obtained using angles of oscillation of about 30 to 120° and periods of oscillation of about ½ to 1½ cycles per minute. If desired, the angle and period of oscillation may be varied in a predetermined or in a random manner as extrusion proceeds.

In the accompanying drawings which illustrate one form of this invention,

Fig. 1 is a plan view of a portion of an apparatus for producing blown tubing,

Fig. 2 is a cross-sectional view, in elevation, taken along the line 2—2 of Fig. 1 and also showing certain related equipment diagrammatically, Fig. 3 is a cross-sectional view, in elevation, taken along the line 3—3 of Fig. 1, and Fig. 4 is a cross-sectional view of a modified form of the apparatus.

Like reference numerals indicate like parts throughout the several views of the drawings.

Referring now to the drawings, reference numeral 11 (Fig. 2) indicates diagrammatically an extruder for supplying a heated thermoplastic material, such as polyethylene, in a plastic state and under pressure to a heated extrusion die 12, while reference numeral 13 indicates diagrammatically a source of air under pressure. The die 12, which is of the conventional type used for the manufacture of blown tubing, has an annular opening 14 through which the heated thermoplastic material is extruded in the form of tubing 16 and also has a central passageway 17 through which the air from the source 13 is blown inside the extruded tubing 16 to inflate the tubing, while it is still in a plastic state, to a predetermined diameter.

While the tubing 16 is being inflated a stream of air, or other suitable cooling fluid, is impinged on the outer surface thereof by means of an annular distributor designated generally by reference numeral 18. This distributor 18 comprises upper and lower annular members or rings 19 and 21, respectively (Fig. 2) serving as the walls thereof and secured together by means of peripheral bolts 22 and mounted, for either oscillation or rotation, on a stationary annular support 23 by means of rollers 24 and ball bearings 26. Air or other cooling fluid is supplied from a stationary blower, shown diagrammatically as 27, to an inlet 28 in the annular support 23 and passes through the space between the upper and lower rings 19 and 21 to an annular passage 29 therein, from which it is discharged onto the outer surface of the tubing 16. In order to equalize the air pressures in the space between the upper and lower rings 19 and 21, and to make the flow of the air through this space more uniform, there are provided concentric baffles 31 and 32 projecting downward from the upper ring, and an intermediate baffle 33, concentric with the other two baffles, projecting upward from the lower ring.

Leakage of air or other cooling fluid between the annular support 23 and the upper and lower rings 19 and 21 is prevented by means of a pair of annular rubber seals 34 and 36, each of which is cemented to an annular shoulder 37 or 38 on said support and each of which engages, and is deflected from its normally substantially flat condition by, a rounded portion 39 or 41 of said rings. Rubber seals 34 and 36 serve as walls in defining a substantially enclosed space for air passage. This construction provides an economical and highly effective seal between the stationary base and the moving distributor 18. Preferably, the annular seals 34 and 36 are formed of an oxidation-resistant synthetic rubber such as neoprene.

The apparatus of this invention also includes means for adjusting the dimensions of the discharge passage 29. To this end a wall of this passage consists of a bevelled flexible annular member 42 supported on a number of studs 43 disposed at uniformly spaced intervals all around the lower ring 21, each stud being threaded on a corresponding adjusting screw 44 mounted in said lower ring. For rotating the screws 44 so as to raise or lower the studs 43 there are provided a series of radial shafts 46, mounted in lugs 47, 48 projecting from the bottom of the lower ring 21. At the ends of the shafts 46 are gears 49 adapted to engage gears 51 fixed to the screws 44. In this manner one part of the flexible member 42 may be raised and another lowered so as to obtain any desired pattern of flow of the cooling fluid against the tubing 16, and non-uniformity of air flow or air temperature around the ring may be compensated for to a large extent.

The bevelled upper surface of the flexible member 42 is parallel to the bevelled adjacent surface 52 of the upper ring 19, the angle of these bevels being such that the stream of air emerging from the passage 29 has a component directed along the line of movement of the extruded tubing 16 as well as radially towards the surface of said tubing. The inner side 53 of the flexible member 42 is cylindrical and adapted to fit closely against the outer surface of a cylindrical sleeve 54 projecting upward from the lower ring 21. It is convenient to make the flexible member 42 of rubber, preferably oxidation-resistant rubber such as neoprene. The close fit between the flexible rubber member 42 and the metal sleeve 54 serves to prevent leakage of air between said member and said sleeve.

The distributor 18 is given an oscillating or, if desired, a rotating motion by means of a motor 56 (Fig. 1) which is operatively connected, through a variable speed transmission 56a, to the distributor through a pulley 57 engaged by a drive belt 58 disposed in a circumferential groove 59 in the upper ring 19. The motor 56 is controlled by a reversing switch 61 (Fig. 1) which, like the motor, is mounted on a bracket 62 secured to the support 23. The switch has two operating levers 63 and 64 positioned at different distances from the distributor 18, each lever being adapted to be engaged by a corresponding tripper 66 or 67 mounted on, and extending from, the upper ring 19. When the distributor 18 has been driven through the desired angle in one direction around the tubing 16, one of the trippers 66 engages the appropriate lever 63 and operates the switch 61 to reverse the direction of rotation of the motor 56, causing the distributor 18 to move in the opposite direction until the other lever 64 of the switch is engaged by the other tripper 67, which causes the motor to resume its original direction of movement. In order to adjust the angle of oscillation, the position of one or both of the trippers 66 or 67 may be changed. If rotation, rather than oscillation, of the distributor is desired, the trippers 66 and 67 or the reversing switch 61 may be removed.

In Fig. 4 there is shown another form of construction of the central portion of the lower ring and the means for adjusting the flow of air onto the extruded tubing. In this construction the lower ring 121, which is otherwise identical with ring 21, has an upwardly directed inner cylinder flange 122. This flange is internally threaded to receive a threaded annular metal spacing member 123 having a flanged rim 124, the upper surface of which is bevelled parallel to the adjacent bevelled surface 52 of the upper ring 19. Thus, the upper surface of the rim 124 and the surface 52 constitute the walls of an annular passage 126 for discharging air onto the tubing 16 at the same angle as in the apparatus shown in Fig. 2. The width of this passage 126 is constant around its circumference and may be adjusted by rotating the threaded spacing member 123 to move said member up and down. For convenience in making this adjustment the spacing member may be provided with holes 127 for receiving a suitable tool. A sealing ring 128 serves to prevent leakage of air between the flange 122 and the spacing member 123.

As in the conventional apparatus, after the tubing 16 has been expanded to the desired diameter and cooled to a set condition, it is passed through the nip of a pair of driven draw rolls (not shown) whereby the tubing is collapsed and flattened into the form of a continuous strip, which strip is then wound on a roll (not shown). The speed of the draw rolls is such that they also serve to exert a stretching force on the tubing which is being inflated.

It is to be understood that the foregoing detailed description is merely given by way of illustration and that many variations may be made therein without departing from the spirit of our invention.

Having described our invention, what we desire to secure by Letters Patent is:

1. Process for the production of blown tubing which comprises continuously extruding a heated thermoplastic material in the form of tubing, continuously inflating said tubing while it is in the heated plastic state, continuously cooling the outer surface of the tubing being extruded by passing said tubing through an annular stream of cooling fluid directed against said surface from an annular source, and oscillating said source around said tubing through an angle of oscillation from about 30° to 120° at a rate of oscillation from about ½ to 1½ cycles per minute.

2. Apparatus for the production of blown tubing comprising a die for continuously extruding a heated material in the form of tubing, means for continuously inflating said tubing, a distributor for continuously directing an annular stream of cooling fluid against the outer surface of the tubing being extruded, and means for oscillating said distributor around said tubing.

3. Apparatus as set forth in claim 2 in which the distributor has an annular discharge passage for directing a converging stream of cooling fluid in the direction of movement of said tubing.

4. Apparatus as set forth in claim 2 in which said means for oscillating said distributor comprises a motor operatively connected to said distributor, an element for changing the direction of movement of said motor and means carried by said distributor for actuating said element.

5. Apparatus as set forth in claim 2 in which said means for oscillating said distributor comprises an electric motor operatively connected to said distributor, a reversing switch for changing the direction of movement of said motor, and spaced trippers carried by said distributor for actuating said reversing switch.

6. Apparatus for the production of blown tubing comprising a die for continuously extruding a heated material in the form of tubing, means for continuously inflating said tubing, a distributor for continuously directing an annular stream of cooling fluid against the outer surface of the tubing being extruded, means for moving said distributor around said tubing, said distributor having annular walls defining an annular entrance opening for receiving said cooling fluid, and stationary means for supplying said cooling fluid to said annular entrance opening, said stationary means having annular walls in sealed contact with the first mentioned annular walls of said entrance opening.

7. Apparatus as set forth in claim 6 in which one of said annular walls on said stationary means comprises a flexible material which is flexed by engagement with the annular wall which is in sealed contact therewith.

8. Apparatus as set forth in claim 7 in which said flexible material is an annular strip of rubber.

9. Apparatus for the production of blown tubing comprising a die for continuously extruding a heated material in the form of tubing, means for continuously inflating said tubing, a distributor for continuously directing an annular stream of cooling fluid against a surface of the tubing being extruded, said distributor having a pair of annular walls defining an annular passageway for discharging said annular stream, one of said walls comprising a continuous flexible annular member, and a plurality of independent spaced adjustable elements for varying the distance between said flexible member and the other wall of said pair.

10. Apparatus as set forth in claim 9 and further comprising means for moving said distributor around said tubing.

11. Apparatus as set forth in claim 9 and further comprising means for oscillating said distributor around said tubing.

12. Apparatus as set forth in claim 9 in which said adjustable elements comprise screw-threaded members mounted on said distributor for movement relatively thereto.

13. Apparatus as set forth in claim 12 and further comprising independent control rods extending radially of said distributor and operatively connected to said screw threaded members.

14. Apparatus for the production of blown tubing comprising a die for continuously extruding a heated material in the form of tubing, means for continuously inflating said tubing, a distributor for continuously directing an annular stream of cooling fluid against the outer surface of the tubing being extruded, means for moving said distributor around said tubing, said distributor having annular walls defining an annular entrance opening for receiving said cooling fluid into said distributor and an annular opening for passing said cooling fluid out of said distributor and against said outer tubing surface, stationary means for supplying said cooling fluid to said annular entrance opening, and means on said distributor for adjusting the width of said exit opening.

15. Apparatus as set forth in claim 14 in which one of said annular walls is formed by one end of an annular member adjustably threaded in said distributor around said tubing.

References Cited in the file of this patent

UNITED STATES PATENTS

| | | |
|---|---|---|
| 2,632,206 | Pierce | Mar. 24, 1953 |
| 2,697,852 | Bailey | Dec. 28, 1954 |
| 2,770,009 | Rogal et al. | Nov. 13, 1956 |